United States Patent
Lin et al.

(10) Patent No.: US 10,516,314 B2
(45) Date of Patent: Dec. 24, 2019

(54) SLIM REEL-TYPE BRUSHLESS MOTOR AND INSULATION SEAT THEREOF

(71) Applicant: DELTA ELECTRONICS, INC., Taoyuan (TW)

(72) Inventors: Chih-Wei Lin, Taoyuan (TW); Sheng-En Mai, Taoyuan (TW); Kun-Fu Chuang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 263 days.

(21) Appl. No.: 15/790,307

(22) Filed: Oct. 23, 2017

(65) Prior Publication Data
US 2018/0191219 A1    Jul. 5, 2018

(30) Foreign Application Priority Data
Dec. 30, 2016 (CN) .................... 2016 2 1490280 U (51) Int. Cl.
| | |
|---|---|
| H02K 5/08 | (2006.01) |
| H02K 1/14 | (2006.01) |
| H02K 5/16 | (2006.01) |
| H02K 1/18 | (2006.01) |
| H02K 21/22 | (2006.01) |

(52) U.S. Cl.
CPC .............. *H02K 5/08* (2013.01); *H02K 1/145* (2013.01); *H02K 1/187* (2013.01); *H02K 5/16* (2013.01); *H02K 21/227* (2013.01)

(58) Field of Classification Search
CPC ..................................... H02K 1/145
See application file for complete search history.

(56) References Cited

U.S. PATENT DOCUMENTS

| | | | | |
|---|---|---|---|---|
| 3,549,918 A | * | 12/1970 | van Hout | H02K 37/14 310/49.17 |
| 4,794,292 A | * | 12/1988 | Torisawa | H02K 37/14 310/257 |
| 5,331,237 A | * | 7/1994 | Ichimura | H02K 1/02 310/44 |
| 6,787,964 B2 | | 9/2004 | Huang et al. | |

* cited by examiner

*Primary Examiner* — Dang D Le
(74) *Attorney, Agent, or Firm* — Kirton McConkie; Evan R. Witt (57) ABSTRACT

An insulation seat of a slim reel-type brushless motor includes a ring-shaped bottom plate, an inner plate and an outer plate. The ring-shaped bottom plate has an opening. The inner plate is arranged around the opening. At least one upper locking element is protruded upwardly from the inner plate. At least one lower locking element is protruded downwardly from the inner plate. The upper locking element and the lower locking element are staggered. The outer plate is arranged around an outer periphery of the ring-shaped bottom plate. An accommodation space is defined by the ring-shaped bottom plate, the inner plate and the outer plate. A coil is disposed within the accommodation space. The at least one upper locking element of the inner plate is engaged with a first magnetic seat. The at least one lower locking element of the inner plate is engaged with a second magnetic seat.

28 Claims, 10 Drawing Sheets

SLIM REEL-TYPE BRUSHLESS MOTOR AND INSULATION SEAT THEREOF

FIELD OF THE INVENTION

The present invention relates to a brushless motor and an insulation seat thereof, and more particularly to a slim reel-type brushless motor and an insulation seat thereof.

BACKGROUND OF THE INVENTION

Nowadays, the trends of designing electronic products are toward slimness. For example, the thickness of the motor used in the electronic product is gradually reduced. Consequently, many benefits such as slimness, low noise and high efficiency could be achieved.

Figure 1A:
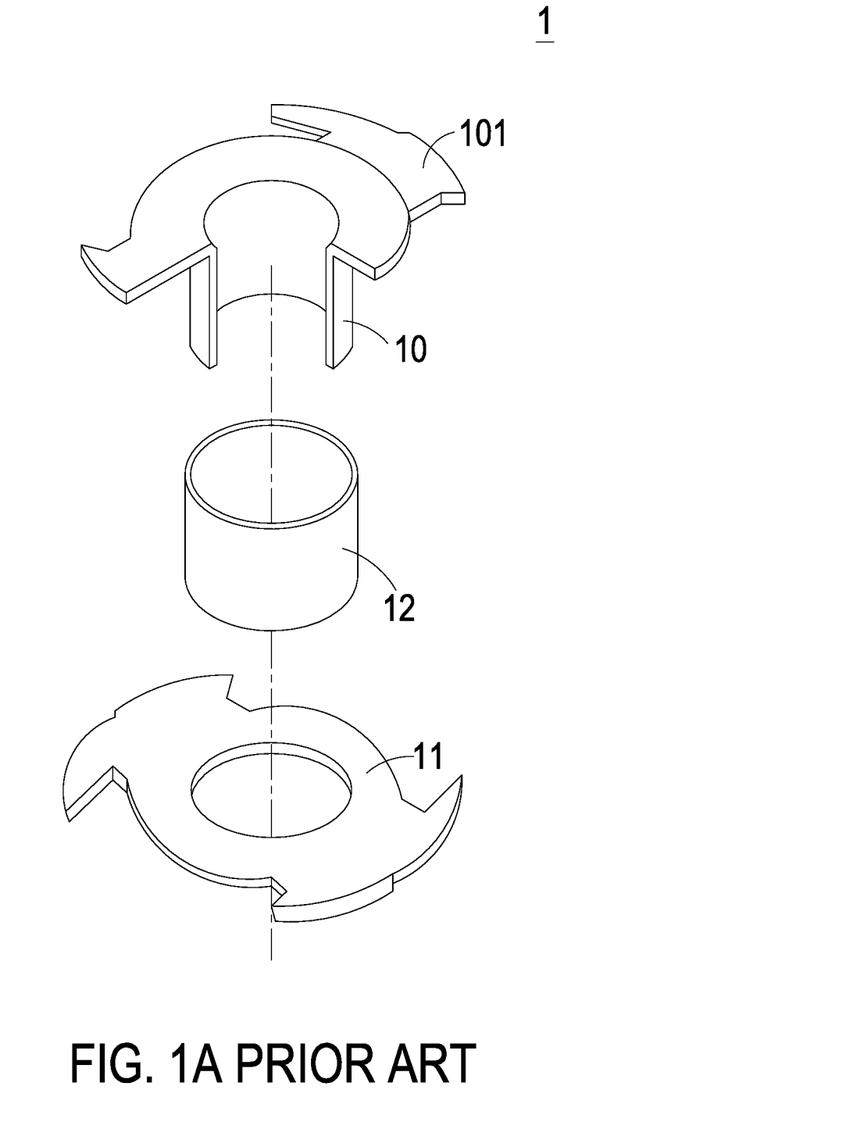
FIG. 1A is a schematic exploded view illustrating a stator assembly of a conventional motor.
Figure 1B:
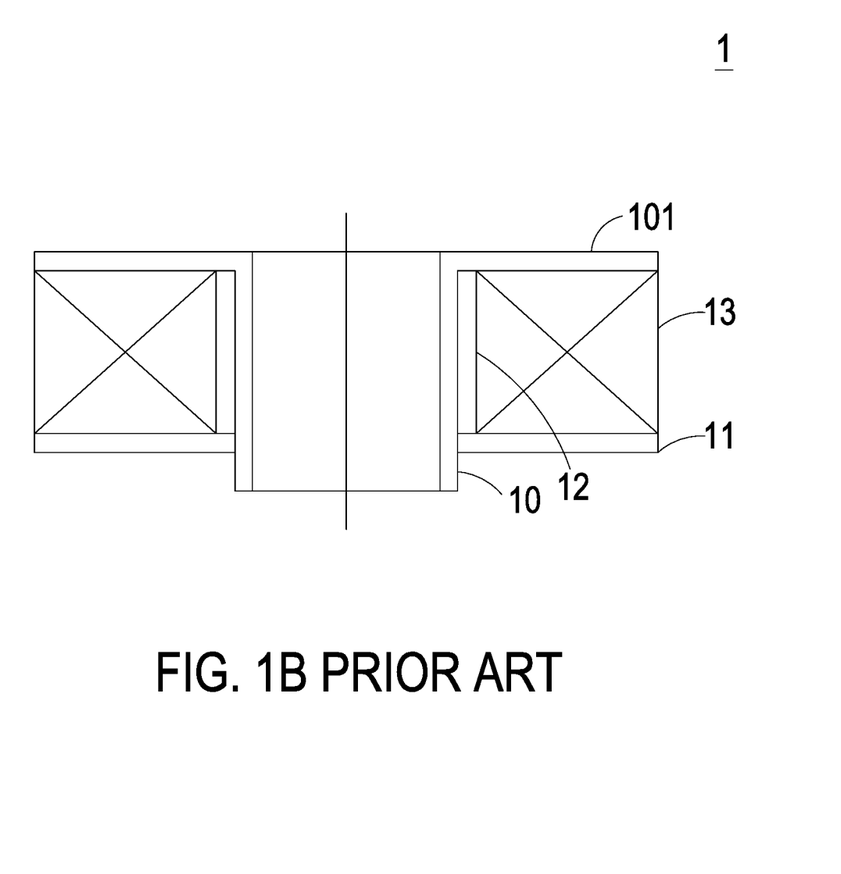
FIG. 1B is a schematic cross-sectional view illustrating the stator assembly of FIG. 1A.

FIG. 1A is a schematic exploded view illustrating a stator assembly of a conventional motor. FIG. 1B is a schematic cross-sectional view illustrating the stator assembly of FIG. 1A. For example, the brushless motor 1 shown in FIGS. 1A and 1B is a slim reel-type brushless motor disclosed in U.S. Pat. No. 6,285,108. The brushless motor 1 comprises a magnetic conductive tube 10, a lower pole plate 11 and a bobbin 12. The magnetic conductive tube 10 is made of magnetic material. Moreover, an upper pole plate 101 is extended from an end of the magnetic conductive tube 10. The lower pole plate 11 is also made of magnetic material. The bobbin 12 is arranged between the magnetic conductive tube 10 and lower pole plate 11. After the magnetic conductive tube 10, the lower pole plate 11 and the bobbin 12 are combined together, a winding space is defined by the upper pole plate 101, the lower pole plate 11 and the bobbin 12. In addition, a coil 13 is wound on an outer surface of bobbin 12 and within the winding space.

In the brushless motor 1, the bobbin 12 is made of insulation material and the coil 13 is wound on the bobbin 12. When the brushless motor 1 is designed, only the winding structure and the insulating function are taken into consideration. However, the structures of positioning the stator, the coil, the driving circuit and other components are not designed.

Figure 2:
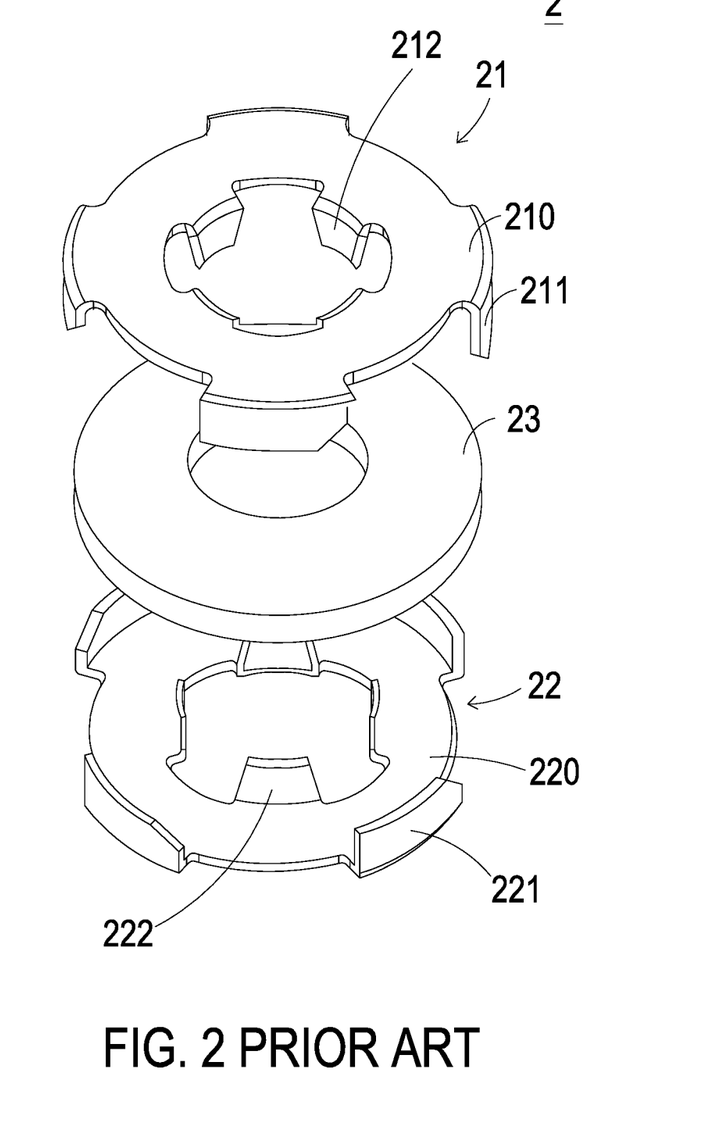
FIG. 2 is a schematic exploded view illustrating a stator assembly of another conventional motor.

FIG. 2 is a schematic exploded view illustrating a stator assembly of another conventional motor. For example, the motor 2 of FIG. 2 is a miniature motor disclosed in U.S. Pat. No. 6,787,964. As shown in FIG. 2, the miniature motor 2 comprises a first coil seat 21, a second coil seat 22 and a coil 23. Both of the first coil seat 21 and the second coil seat 22 are made of conductive material. The first and second coil seats 21, 22 comprise ring-shaped bottom plates 210 and 220, respectively. Moreover, plural outer teeth 211 are protruded from and arranged around the outer periphery of the bottom plate 210, and plural outer teeth 221 are protruded from and arranged around the outer periphery of the bottom plate 220. Since the bottom plates 210 and 220 are ring-shaped, the bottom plates 210 and 220 have corresponding central openings. Moreover, plural inner teeth 212 are protruded from the inner periphery of the bottom plate 210 and arranged around the central opening of the bottom plate 210, and plural inner teeth 222 are protruded from the inner periphery of the bottom plate 220 and arranged around the central opening of the bottom plate 220. For combining with the first and second coil seats 21, 22, the outer teeth 211 of the first coil seat 21 and the outer teeth 221 of the second coil seat 22 are staggered, and the inner teeth 212 of the first coil seat 21 and the inner teeth 222 of the second coil seat 22 are staggered. In addition, the preformed coil 23 is accommodated within a space between the first and second coil seats 21, 22. For electrically isolating the coil 23 from the first and second coil seats 21, 22, the coil 23 should have a specially-designed insulation surface.

The miniature motor 2 has small volume. However, the structures of positioning the stator, the coil, the driving circuit and other components are not designed. Since some drawbacks are caused by the lack of the positioning structures, the process of assembling the miniature motor 2 is time-consuming and labor-intensive. That is, the fabricating cost is increased.

In some other conventional technologies, an I-shaped bobbin is employed to wind the coil and assemble with the upper pole plate and the lower pole plate. When the I-shaped bobbin is designed, only the winding structure and the insulating function are taken into consideration. Similarly, the structures of positioning other components are not designed. Moreover, the winding space of the I-shaped bobbin is restricted by the upper pole plate and the lower pole plate. Consequently, the operating efficiency of the motor could be reduced.

Conventionally, the bobbin is combined with the stator or the driving circuit through a percussion riveting means or a dispensing means. However, the assembling process is complicated and time-consuming, and the product quality is adversely affected by the I-shaped bobbin.

Therefore, there is a need of providing an improved slim reel-type brushless motor and an insulation seat thereof in order to overcome the above drawbacks.

SUMMARY OF THE INVENTION

An object of the present invention provides a slim reel-type brushless motor and an insulation seat. By using the inventive slim reel-type brushless motor and the insulation seat, the components of the motor can be effectively positioned, and fabricating process of the motor is simplified and time-saving. In addition, the operating efficiency could be enhanced.

In accordance with an aspect of the present invention, an insulation seat of a slim reel-type brushless motor is provided. The insulation seat includes a ring-shaped bottom plate, an inner plate and an outer plate. The ring-shaped bottom plate has an opening. The inner plate is arranged around the opening. At least one upper locking element is protruded upwardly from the inner plate. At least one lower locking element is protruded downwardly from the inner plate. The at least one upper locking element and the at least one lower locking element are staggered. The outer plate is arranged around an outer periphery of the ring-shaped bottom plate. An accommodation space is defined by the ring-shaped bottom plate, the inner plate and the outer plate. A coil is disposed within the accommodation space. The at least one upper locking element of the inner plate is engaged with a first magnetic seat. The at least one lower locking element of the inner plate is engaged with a second magnetic seat.

In accordance with another aspect of the present invention, an insulation seat of a slim reel-type brushless motor is provided. The insulation seat includes a ring-shaped bottom plate, an inner plate and an outer plate. The ring-shaped bottom plate includes an opening and at least one fixing element. The inner plate is arranged around the opening. The outer plate is arranged around an outer periphery of the ring-shaped bottom plate. An accommodation space is defined by the ring-shaped bottom plate, the inner plate and the outer plate. A coil is disposed within the accommodation space. The at least one fixing element is disposed on a bottom surface of the ring-shaped bottom plate. The insulation seat and a circuit board are combined together through the at least one fixing element.

In accordance with another aspect of the present invention, a slim reel-type brushless motor is provided. The slim reel-type brushless motor includes a first magnetic seat, a second magnetic seat, an insulation seat, a coil and a circuit board. The insulation seat includes a ring-shaped bottom plate, an inner plate and an outer plate. The ring-shaped bottom plate has an opening. The inner plate is arranged around the opening. At least one upper locking element is protruded upwardly from the inner plate. At least one lower locking element is protruded downwardly from the inner plate. The at least one upper locking element and the at least one lower locking element are staggered. The outer plate is arranged around an outer periphery of the ring-shaped bottom plate. An accommodation space is defined by the ring-shaped bottom plate, the inner plate and the outer plate. The coil is disposed within the accommodation space. The at least one upper locking element of the inner plate is engaged with the first magnetic seat. The at least one lower locking element of the inner plate is engaged with the second magnetic seat. The circuit board is positioned under the insulation seat.

In accordance with another aspect of the present invention, a slim reel-type brushless motor is provided. The slim reel-type brushless motor includes a first magnetic seat, a second magnetic seat, a magnetic sleeve, an insulation seat, a coil and a circuit board. The insulation seat includes a ring-shaped bottom plate, an inner plate and an outer plate. The ring-shaped bottom plate has an opening. The inner plate is arranged around the opening. At least one upper locking element is protruded upwardly from the inner plate. At least one lower locking element is protruded downwardly from the inner plate. The at least one upper locking element and the at least one lower locking element are staggered. The outer plate is arranged around an outer periphery of the ring-shaped bottom plate. An accommodation space is defined by the ring-shaped bottom plate, the inner plate and the outer plate. The coil is disposed within the accommodation space. The at least one upper locking element of the inner plate is engaged with the first magnetic seat and a top edge of the magnetic sleeve. The at least one lower locking element of the inner plate is engaged with the second magnetic seat and a bottom edge of the magnetic sleeve. The circuit board is positioned under the insulation seat.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 3A:
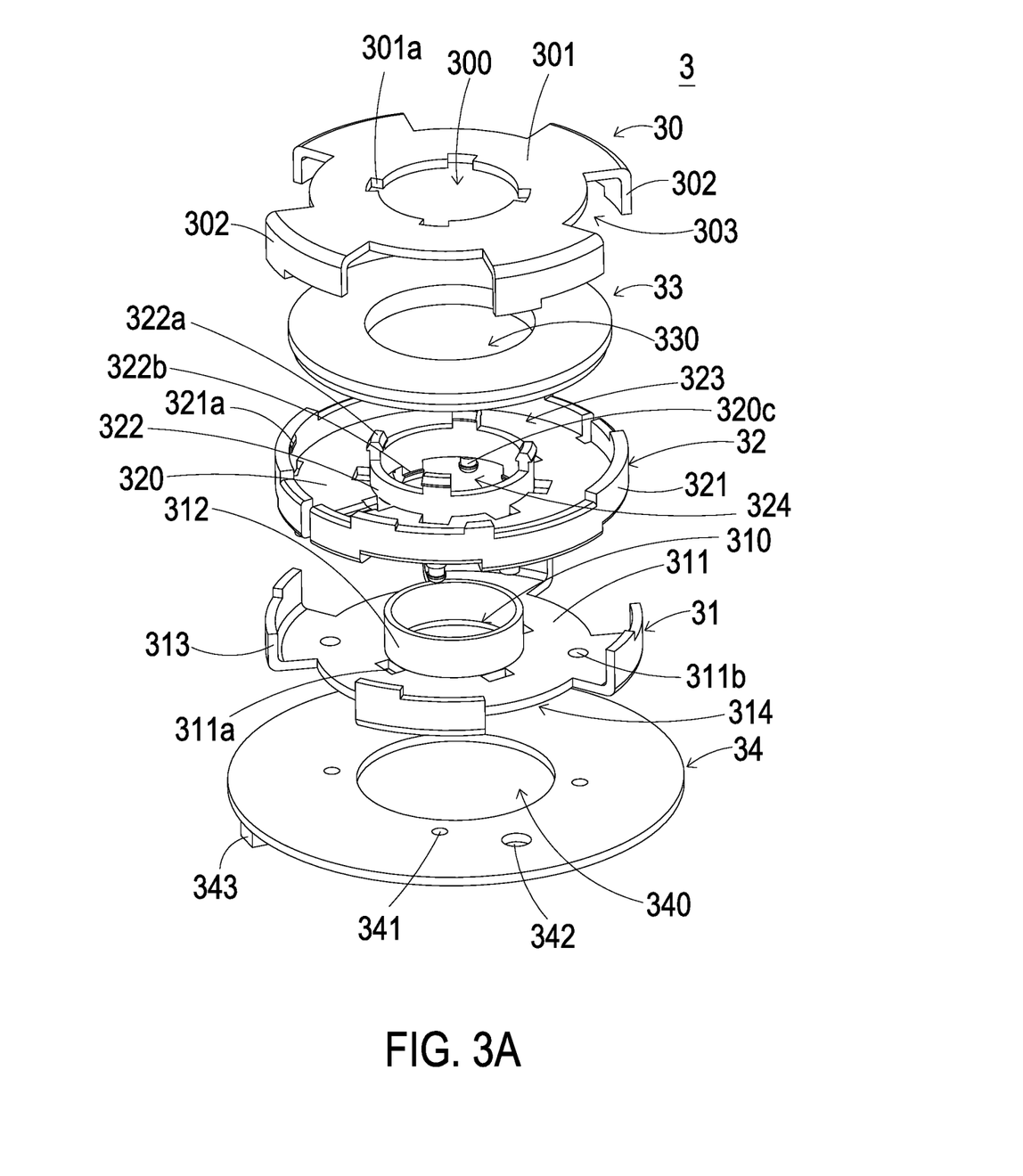
FIG. 3A is a schematic exploded view illustrating a portion of a slim reel-type brushless motor according to a first embodiment of the present invention.

FIG. 3A is a schematic exploded view illustrating a portion of a slim reel-type brushless motor according to a first embodiment of the present invention. The slim reel-type brushless motor comprises a stator assembly and a rotator assembly. For succinctness, only the stator assembly 3 of the slim reel-type brushless motor is shown in FIG. 3A, but the rotator assembly is not shown. As shown in FIG. 3A, the stator assembly 3 comprises a first magnetic seat 30, a second magnetic seat 31, an insulation seat 32, a coil 33 and a circuit board 34.

The insulation seat 32 comprises a ring-shaped bottom plate 320, an outer plate 321 and an inner plate 322. An opening 324 is formed in a center of the ring-shaped bottom plate 320. The inner plate 322 is arranged around the opening 324. Moreover, plural upper locking elements 322a are protruded upwardly from the inner plate 322, and plural lower locking elements 322b are protruded downwardly from the inner plate 322. In this embodiment, the upper locking elements 322a and the lower locking elements 322b are staggered. The outer plate 321 is arranged around the outer periphery of the ring-shaped bottom plate 320. Moreover, an accommodation space 323 is defined by the ring-shaped bottom plate 320, the inner plate 322 and the outer plate 321 of the insulation seat 32. The coil 33 is disposed within the accommodation space 323. Preferably but not exclusively, the coil 33 is a preformed coil. When the insulation seat 32 is combined with the first and second magnetic seats 30, 31, the upper locking elements 322a of the inner plate 322 are engaged with the first magnetic seat 30, and the lower locking elements 322b of the inner plate 322 are engaged with the second magnetic seat 31. Moreover, the circuit board 34 is disposed under the insulation seat 32.

Figure 3B:
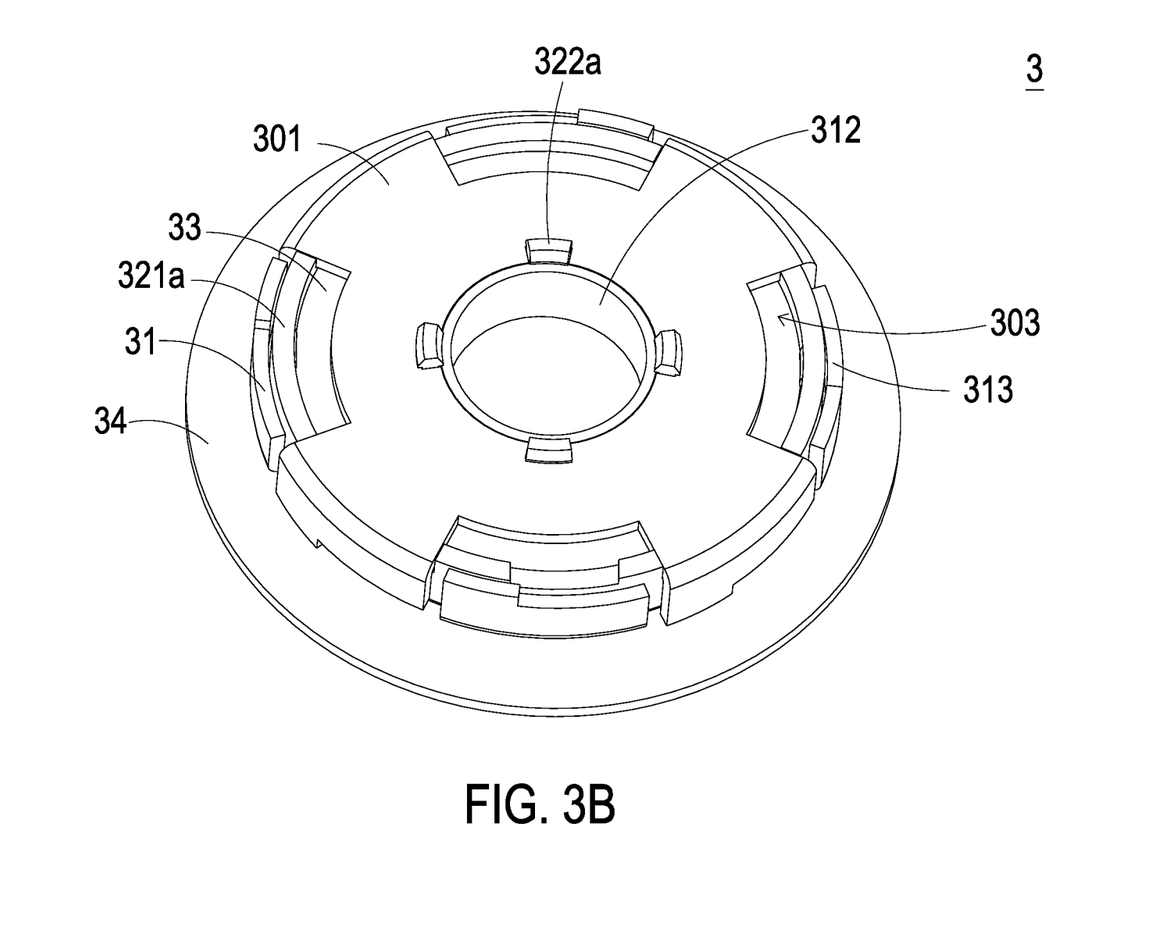
FIG. 3B is a schematic perspective view illustrating the stator assembly of the slim reel-type brushless motor according to the first embodiment of the present invention and taken along a front viewpoint.

FIG. 3B is a schematic perspective view illustrating the stator assembly of the slim reel-type brushless motor according to the first embodiment of the present invention and taken along a front viewpoint. Please refer to FIGS. 3A and 3B. The first magnetic seat 30 is aligned with the insulation seat 32 and the coil 33. The first magnetic seat 30 comprises plural first engaging elements 301a corresponding to the upper locking elements 322a of the inner plate 322. In this embodiment, the first magnetic seat 30 comprises a first plate 301. The first plate 301 is a ring-shaped plate with a central opening 300. The plural first engaging elements 301a are arranged around the opening 300. Moreover, plural first sidewalls 302 are protruded downwardly from the outer periphery of the first plate 301. Moreover, the first plate 301 comprises plural first receiving parts 303 between the first sidewalls 302.

The second magnetic seat 31 is disposed under the insulation seat 32, and arranged between the insulation seat 32 and the circuit board 34. The second magnetic seat 31 comprises plural second engaging elements 311a corresponding to the lower locking elements 322b of the inner plate 322. In this embodiment, the second magnetic seat 31 comprises a second plate 311. The second plate 311 is a ring-shaped plate with a central opening 310. Moreover, an inner wall 312 is protruded upwardly from the second magnetic seat 31 and arranged around the opening 310. Preferably, the inner wall 312 has a tube structure. The plural second engaging elements 311a are arranged around the opening 310 and the inner wall 312. Moreover, plural second sidewalls 313 are protruded upwardly from the outer periphery of the second plate 311, and the second plate 311 comprises plural second receiving parts 314 between the second sidewalls 313. The first sidewalls 302 of the first magnetic seat 30 are received within the corresponding second receiving parts 314 of the second magnetic seat 31, and the plural second sidewalls 313 of the second magnetic seat 31 are received within the corresponding first receiving parts 303 of the first magnetic seat 30. In this embodiment, the first magnetic seat 30 comprises four first sidewalls 302 and four first receiving parts 303, and the second magnetic seat 31 comprises four second sidewalls 313 and four second receiving parts 314. Due to the first receiving parts 303 of the first magnetic seat 30 and the second receiving parts 314 of the second magnetic seat 31, the overall thickness of the stator assembly 3 is decreased. Consequently, the volume of the slim reel-type brushless motor could be reduced.

In an embodiment, the first magnetic seat 30 and the second magnetic seat 31 are made of magnetic material such as iron. Preferably but not exclusively, the first and second magnetic seats 30, 31 are integral structures. It is noted that the profiles and numbers of the first sidewalls 302, the second sidewalls 313, the first receiving parts 303 and the second receiving parts 314 may be varied according to the practical requirements.

Please refer to FIG. 3A again. The circuit board 34 is a driving circuit board. In this embodiment, the circuit board 34 is a ring-shaped circuit board with a central opening 340. The circuit board 34 comprises plural third engaging elements 341 and plural fastening elements 342. In this embodiment, the third engaging elements 341 and the fastening elements 342 are circular holes that run through the circuit board 34. The insulation seat 32 further comprises plural fixing elements 320c. The fixing elements 320c penetrate through the corresponding third engaging elements 341. Moreover, plural securing elements such as screws (not shown) are penetrated through the corresponding fastening elements 342 in order to fix the circuit board 34. Moreover, a Hall element 343 is disposed on a bottom surface of the circuit board 34.

Figure 4A:
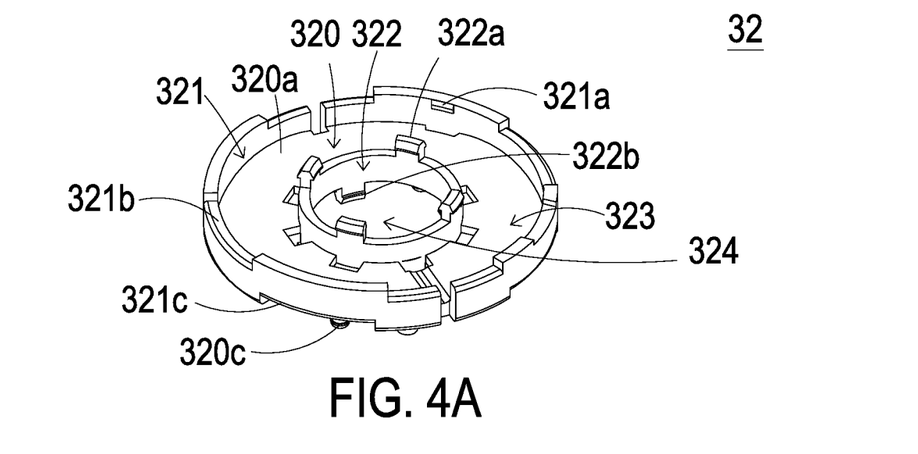
FIG. 4A is a schematic perspective view illustrating a front side of the insulation seat of the slim reel-type brushless motor according to the first embodiment of the present invention.
Figures 4B, 4C:
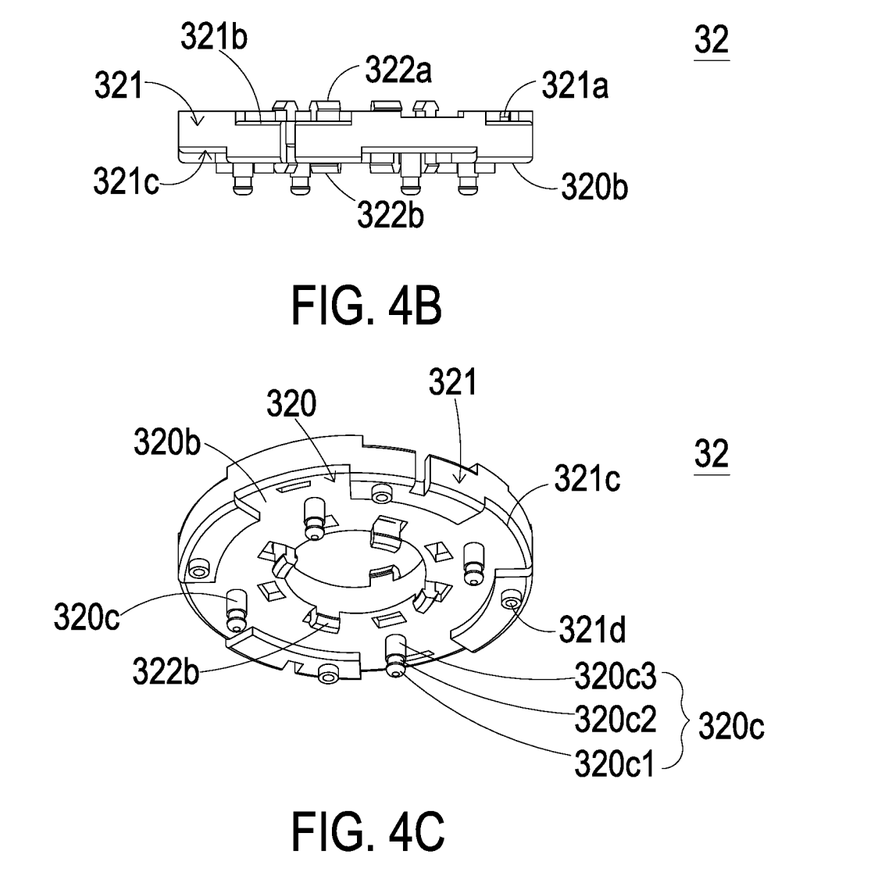
FIG. 4B is a schematic side view illustrating the insulation seat of FIG. 4A.
FIG. 4C is a schematic perspective view illustrating a rear side of the insulation seat of FIG. 4A.

FIG. 4A is a schematic perspective view illustrating a front side of the insulation seat of the slim reel-type brushless motor according to the first embodiment of the present invention. FIG. 4B is a schematic side view illustrating the insulation seat of FIG. 4A. FIG. 4C is a schematic perspective view illustrating a rear side of the insulation seat of FIG. 4A. Please refer to FIGS. 3A, 4A, 4B and 4C. As mentioned above, the insulation seat 32 comprises the ring-shaped bottom plate 320, the outer plate 321 and the inner plate 322. The ring-shaped bottom plate 320 has a top surface 320a and a bottom surface 320b. The opening 324 is formed in the center of the ring-shaped bottom plate 320. The outer plate 321 is arranged around the outer periphery of the ring-shaped bottom plate 320. The inner plate 322 is arranged around the opening 324. Moreover, the accommodation space 323 is defined by the ring-shaped bottom plate 320, the inner plate 322 and the outer plate 321 of the insulation seat 32. The coil 33 is a preformed coil and disposed within the accommodation space 323.

Please refer to FIGS. 3A and 4A again. The outer plate 321 comprises plural stopping elements 321a. The plural stopping elements 321a are disposed on an inner surface of the outer plate 321. The stopping elements 321a are located at a specified height in order to limit the location of the coil 33. When the coil 33 is disposed within the accommodation space 323 of the insulation seat 32, the top surface of the coil 33 is stopped by the stopping elements 321a. Consequently, the coil 33 is positioned in the accommodation space 323 of the insulation seat 32. Under this circumstance, the function of positioning the coil 33 on the insulation seat 32 along an axial direction is achieved. Preferably but not exclusively, the stopping elements 321a are protrusions.

As shown in FIG. 4A, the inner plate 322 is arranged around the opening 324. Preferably but not exclusively, the inner plate 322 arranged around the opening 324 has a tube structure. Moreover, the plural upper locking elements 322a are protruded upwardly from the inner plate 322, and the plural lower locking elements 322b are protruded downwardly from the inner plate 322. In this embodiment, the upper locking elements 322a and the lower locking elements 322b are staggered. In an embodiment, the upper locking elements 322a and the lower locking elements 322b are hooks. Moreover, the first engaging elements 301a of the first magnetic seat 30 and the second engaging elements 311a of the second magnetic seat 31 are engaging holes corresponding to the hooks. After the upper locking elements 322a of the inner plate 322 are penetrated through the first engaging elements 301a of the first magnetic seat 30, the upper locking elements 322a and the first engaging elements 301a are engaged with each other, so that the insulation seat 32 and the first magnetic seat 30 are combined together. Similarly, after the lower locking elements 322b of the inner plate 322 are penetrated through the second engaging elements 311a of the second magnetic seat 31, the lower locking elements 322b and the second engaging elements 311a are engaged with each other, so that the insulation seat 32 and the second magnetic seat 31 are combined together. Due to the upper locking elements 322a and the lower locking elements 322b of the inner plate 322 of the insulation seat 32, the insulation seat 32 is combined with the first magnetic seat 30 and the second magnetic seat 31. Under this circumstance, the functions of positioning the first magnetic seat 30, the second magnetic seat 31 and the insulation seat 32 along an axial direction and a radial direction can be achieved.

Please refer to FIGS. 3A, 4B and 4C again. The insulation seat 32 further comprises plural fixing elements 320c. The fixing elements 320c are disposed on a bottom surface 320b of the ring-shaped bottom plate 320 of the insulation seat 32. The insulation seat 32 and the circuit board 34 are combined together through the plural fixing elements 320c. As shown in FIG. 4C, the fixing element 320c is a cylindrical post. Moreover, the fixing element 320c comprises a protrusion part 320c3, a neck part 320c2 and a head part 320c1. The protrusion part 320c3 is disposed on the bottom surface 320b of the ring-shaped bottom plate 320. The neck part 320c2 is arranged between the protrusion part 320c3 and the head part 320c1. The diameter of the neck part 320c2 is smaller than the diameter of the protrusion part 320c3 and the diameter of the head part 320c1. For example, the head part 320c1 has a circular cross section. That is, the diameter of the head part 320c1 is larger than the diameter of the neck part 320c2 and the diameter of the protrusion part 320c3. As shown in FIG. 3A, the circuit board 34 comprises plural third engaging elements 341 corresponding to the fixing elements 320c. As mentioned above, the third engaging elements 341 are circular holes that run through the circuit board 34. The third engaging elements 341 are aligned with the corresponding fixing elements 320c. The diameter of the third engaging elements 341 is substantially equal to the diameter of the neck part 320c2 of the fixing element 320c. For combining the insulation seat 32 with the circuit board 34, an external force is applied to the insulation seat 32 to allow the head parts 320c1 of the fixing elements 320c to be penetrated through the corresponding third engaging elements 341 (i.e., the circular holes). Consequently, the neck parts 320c2 of the fixing elements 320c are received in the corresponding third engaging elements 341. Since the diameter of the neck part 320c2 is smaller than the diameter of the protrusion part 320c3 and the diameter of the head part 320c1, the two opposite sides of the circuit board 34 are contacted with the head part 320c1 and the protrusion part 320c3, respectively. In other words, the circuit board 34 and the insulation seat 32 are combined together through the engagement between the third engaging elements 341 and the corresponding fixing elements 320c. Under this circumstance, the functions of positioning the insulation seat 32 and the circuit board 34 along the axial direction and the radial direction can be achieved. Moreover, because of the fixing elements 320c, the insulation seat 32 and the second magnetic seat 31 are separated from each other by a specified distance. That is, the insulation seat 32 and the second magnetic seat 31 are separated from each other by the protrusion part 320c3 of the fixing element 320c.

As shown in FIG. 3A, the second plate 311 of the second magnetic seat 31 further comprises plural fourth engaging elements 311b corresponding to the fixing elements 320c of the insulation seat 32. In this embodiment, the fourth engaging elements 311b are circular holes that run through the second plate 311. The diameter of the fourth engaging element 311b is slightly larger than the diameter of the neck part 320c2 of the fixing element 320c. After the fixing elements 320c of the insulation seat 32 are penetrated through the corresponding fourth engaging elements 311b, the fixing elements 320c are further engaged with the circuit board 34.

As shown in FIG. 4C, the insulation seat 32 further comprises plural pillars 321d. The plural pillars 321d are disposed on the bottom surface 320b of the ring-shaped bottom plate 320 and located near the outer plate 321. The two ends of the coil 33 are penetrated through the perforations of the corresponding pillars 321d and electrically connected with the circuit board 34. The profiles, locations and number of the pillars 321d may be varied according to the practical requirements.

Please refer to FIGS. 4A, 4B and 4C again. In some embodiments, the outer plate 321 of the insulation seat 32 further comprises plural first notches 321b and plural second notches 321c. The first notches 321b are formed in the top edge of the outer plate 321. The second notches 321c are formed in the bottom edge of the outer plate 321. The first notches 321b and the second notches 321c are staggered. The junctions between the first plates 301 and the first sidewalls 302 of the first magnetic seat 30 are partially received within the corresponding first notches 321b, and the junctions between the second plates 311 and the second sidewalls 313 of the second magnetic seat 31 are partially received within the corresponding second notches 321c. When the first magnetic seat 30, the second magnetic seat 31 and the insulation seat 32 are combined together, the overall thickness of the stator assembly 3 is effectively reduced. It is noted that the profiles and numbers of the first notches 321b and the second notches 321c may be varied according to the practical requirements.

Figure 3C:
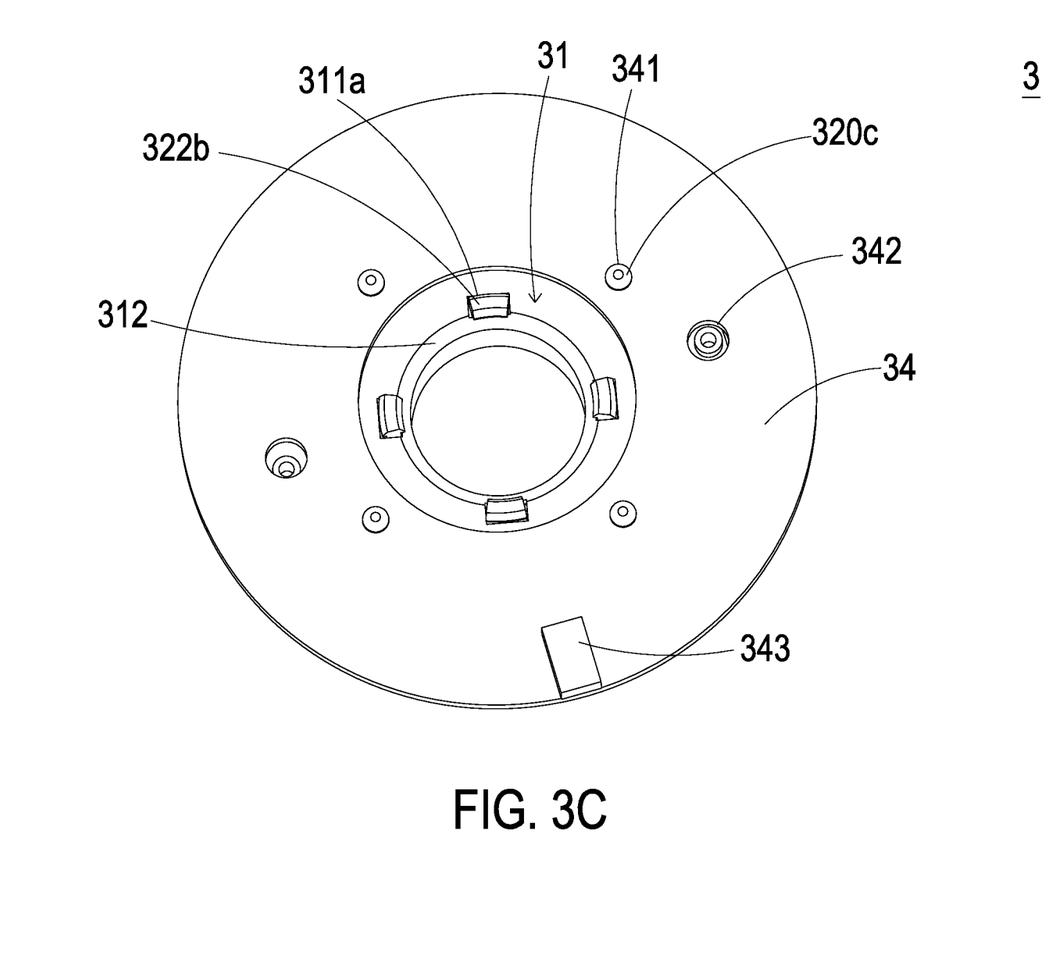
FIG. 3C is a schematic perspective view illustrating the stator assembly of the slim reel-type brushless motor according to the first embodiment of the present invention and taken along a rear viewpoint.

FIG. 3C is a schematic perspective view illustrating the stator assembly of the slim reel-type brushless motor according to the first embodiment of the present invention and taken along a rear viewpoint. Please refer to FIGS. 3A, 3B, 3C, 4A, 4B and 4C. As shown in FIG. 3A, the first magnetic seat 30, the coil 33, the insulation seat 32, the second magnetic seat 31 and the circuit board 34 are sequentially arranged from top to bottom. Moreover, the openings 300 of the first magnetic seat 30, the opening 330 of the coil 33, the opening 324 of the insulation seat 32, the opening 310 of the second magnetic seat 31 and the opening 340 of the circuit board 34 are aligned with each other.

A process of fabricating the stator assembly 3 will be described as follows. Firstly, the preformed coil 33 is disposed within the accommodation space 323 of the insulation seat 32, and the top surface of the coil 33 is stopped by the stopping elements 321a of the outer plate 321 of the insulation seat 32. Consequently, the coil 33 is positioned in the accommodation space 323 of the insulation seat 32. Then, the first magnetic seat 30 is combined with the insulation seat 32, and the second magnetic seat 31 is combined with the insulation seat 32. Consequently, the inner wall 312 of the second magnetic seat 31 is penetrated through the opening 324 of the insulation seat 32 and partially received within the opening 300 of the first magnetic seat 30. Moreover, the first sidewalls 302 of the first magnetic seat 30 are received within the corresponding second receiving parts 314 of the second magnetic seat 31, and the plural second sidewalls 313 of the second magnetic seat 31 are received within the corresponding first receiving parts 303 of the first magnetic seat 30. Moreover, the junctions between the first plates 301 and the first sidewalls 302 of the first magnetic seat 30 are partially received within the corresponding first notches 321b, and the junctions between the second plates 311 and the second sidewalls 313 of the second magnetic seat 31 are partially received within the corresponding second notches 321c. The upper locking elements 322a of the inner plate 322 and the first engaging elements 301a are engaged with each other so that the insulation seat 32 and the first magnetic seat 30 are combined together. The fixing elements 320c of the insulation seat 32 are engaged with the fourth engaging elements 311b of the second magnetic seat 31 so that the second magnetic seat 31 and the insulation seat 32 are combined together. The lower locking elements 322b of the inner plate 322 and the second engaging elements 311a are engaged with each other so that the insulation seat 32 and the second magnetic seat 31 are combined together. Afterwards, the third engaging elements 341 of the circuit board 34 are aligned with the corresponding fixing elements 320c of the insulation seat 32. By applying an external force to the insulation seat 32 to allow the head parts 320c1 of the fixing elements 320c to be penetrated through the corresponding third engaging elements 341 (i.e., the circular holes), the neck parts 320c2 of the fixing elements 320c are received in the corresponding third engaging elements 341. Consequently, the circuit board 34 and the insulation seat 32 are combined together. The front side of the stator assembly 3 is shown in FIG. 3B. The rear side of the stator assembly 3 is shown in FIG. 3C.

As mentioned above, the insulation seat 32 of this embodiment comprises plural positioning structures, including the stopping elements 321a, the upper locking elements 322a, the lower locking elements 322b and the fixing elements 320c. By these positioning structures, the coil 33, the first magnetic seat 30, the second magnetic seat 31 and the circuit board 34 are securely positioned along the axial direction and the radial direction. Due to these positioning structures, the assembling process is simplified, fast and foolproof. Consequently, the assembling process is time-saving and cost-effective. Moreover, since the insulation seat 32 is opened to one side, the filled space of the coil 33 is effectively increased. Consequently, the operation efficiency of the slim reel-type brushless motor could be enhanced.

Figure 5A:
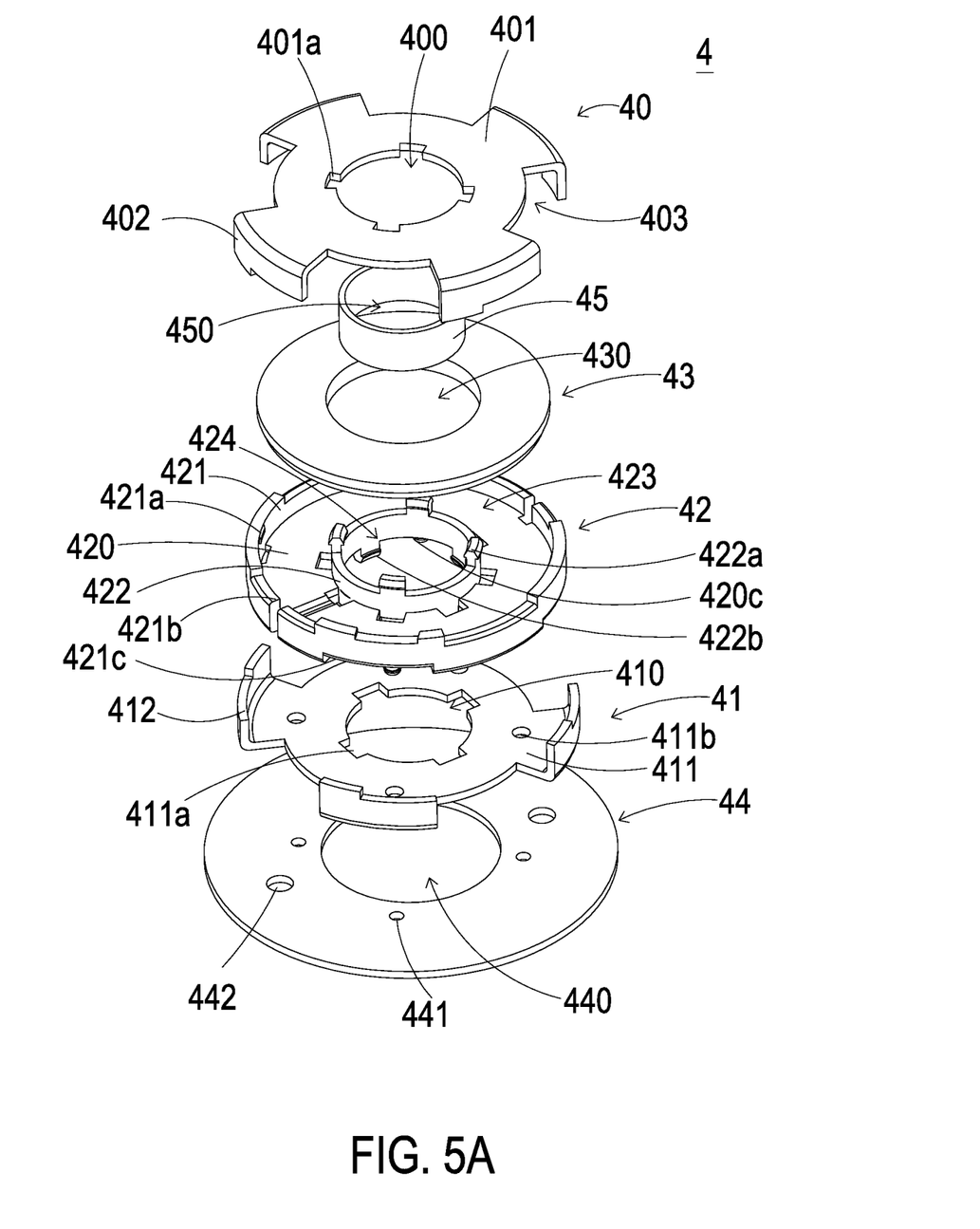
FIG. 5A is a schematic exploded view illustrating a portion of a slim reel-type brushless motor according to a second embodiment of the present invention.
Figure 5B:
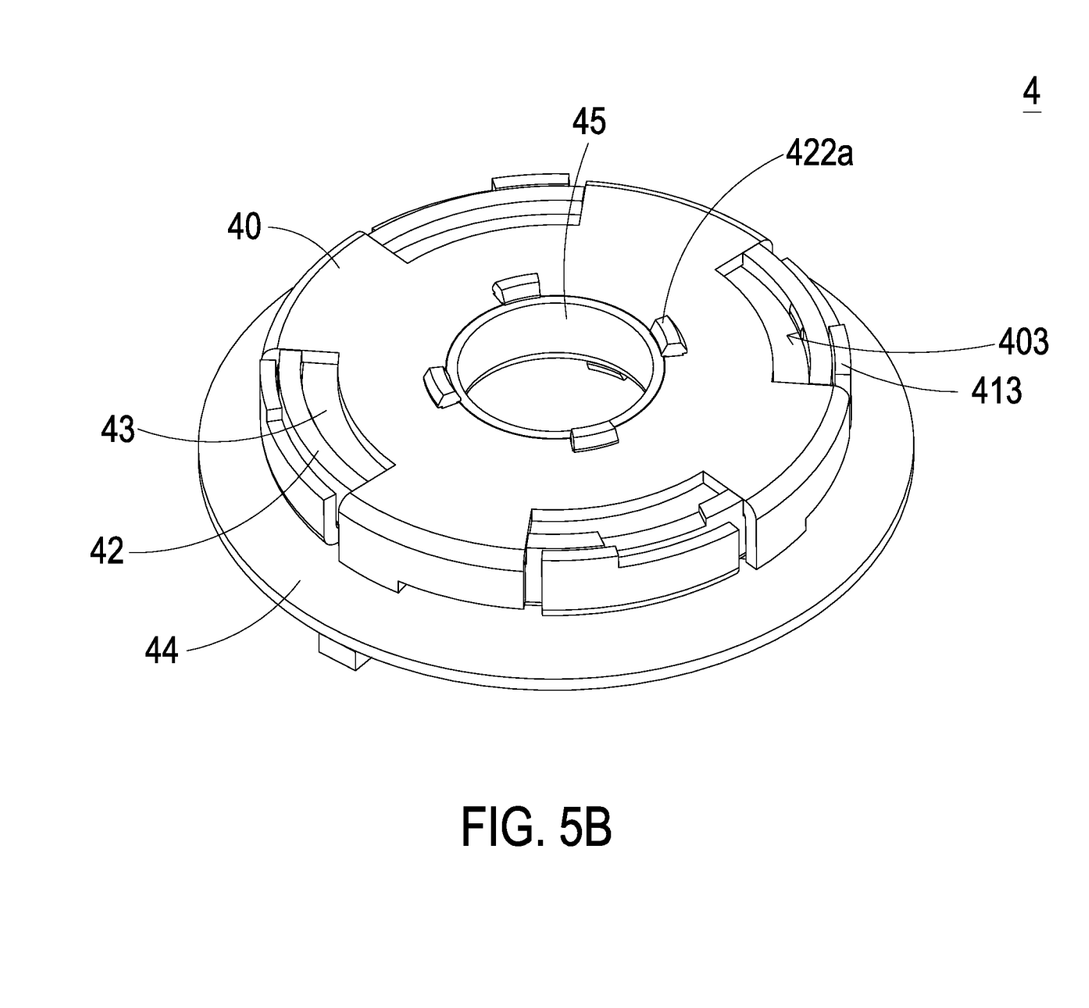
FIG. 5B is a schematic perspective view illustrating the stator assembly of the slim reel-type brushless motor according to the second embodiment of the present invention and taken along a front viewpoint.
Figure 5C:
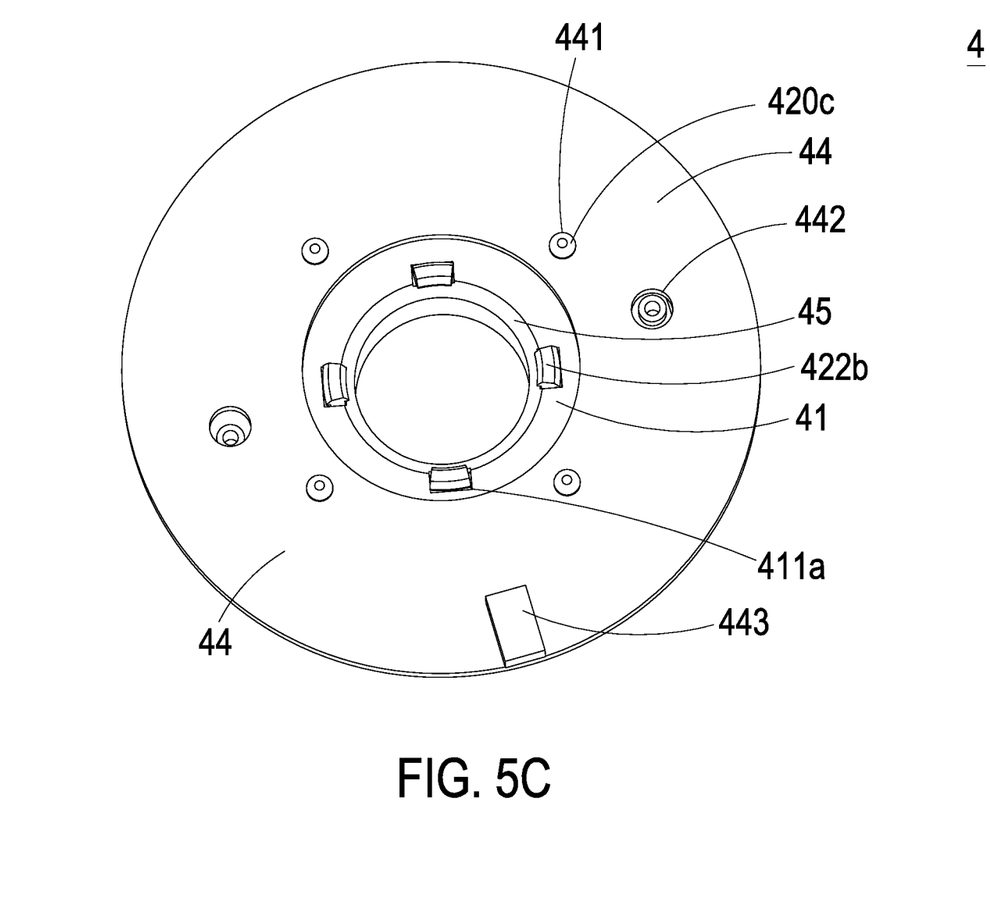
FIG. 5C is a schematic perspective view illustrating the stator assembly of the slim reel-type brushless motor according to the second embodiment of the present invention and taken along a rear viewpoint.

FIG. 5A is a schematic exploded view illustrating a portion of a slim reel-type brushless motor according to a second embodiment of the present invention. FIG. 5B is a schematic perspective view illustrating the stator assembly of the slim reel-type brushless motor according to the second embodiment of the present invention and taken along a front viewpoint. FIG. 5C is a schematic perspective view illustrating the stator assembly of the slim reel-type brushless motor according to the second embodiment of the present invention and taken along a rear viewpoint. The slim reel-type brushless motor comprises a stator assembly and a rotator assembly. For succinctness, only the stator assembly 4 of the slim reel-type brushless motor is shown in FIG. 4A, but the rotator assembly is not shown. As shown in FIG. 4A, the stator assembly 4 comprises a first magnetic seat 40, a second magnetic seat 41, an insulation seat 42, a coil 43 and a circuit board 44.

The insulation seat 42 comprises a ring-shaped bottom plate 420, an outer plate 421 and an inner plate 422. Moreover, plural upper locking elements 422a are protruded upwardly from the inner plate 422, and plural lower locking elements 422b are protruded downwardly from the inner plate 422. The configurations of the first plate 401, the first sidewalls 402 and the first receiving parts 403 of the first magnetic seat 40, the ring-shaped bottom plate 420, the outer plate 421 and the inner plate 422 of the insulation seat 42, the coil 43 and the circuit board 44 are similar to those of the first embodiment, and are not redundantly described herein.

The second magnetic seat 41 of the stator assembly 4 of this embodiment is slightly distinguished from that of the first embodiment. In this embodiment, the second magnetic seat 41 comprises a second plate 411. The second plate 411 is a ring-shaped plate with a central opening 410. Moreover, the second magnetic seat 41 further comprises plural second engaging elements 411a, and the plural second engaging elements 411a are arranged around the opening 410. Moreover, plural second sidewalls 412 are protruded upwardly from the outer periphery of the second plate 411. In other words, the second magnetic seat 41 is not equipped with the inner wall. In this embodiment, the stator assembly 4 further comprises a magnetic sleeve 45. The magnetic sleeve 45 is arranged between the first magnetic seat 40 and the insulation seat 42. Moreover, the magnetic sleeve 45 has an opening 450.

As shown in FIG. 5A, the first magnetic seat 40, the magnetic sleeve 45, the coil 43, the insulation seat 42, the second magnetic seat 41 and the circuit board 44 are sequentially arranged from top to bottom. Moreover, the openings 400 of the first magnetic seat 40, the opening 450 of the magnetic sleeve 45, the opening 430 of the coil 43, the opening 424 of the insulation seat 42, the opening 410 of the second magnetic seat 41 and the opening 440 of the circuit board 44 are aligned with each other.

A process of fabricating the stator assembly 4 will be described as follows. Firstly, the preformed coil 43 is disposed within the accommodation space 423 of the insulation seat 42, and the top surface of the coil 43 is stopped by the stopping elements 421a of the outer plate 421 of the insulation seat 42. Consequently, the coil 43 is positioned in the accommodation space 423 of the insulation seat 42. Then, the first magnetic seat 40 and the magnetic sleeve 45 are combined with the insulation seat 42, and the second magnetic seat 41 is combined with the insulation seat 42. Moreover, the first sidewalls 402 of the first magnetic seat 40 are received within the corresponding second receiving parts of the second magnetic seat 41, and the plural second sidewalls 412 of the second magnetic seat 41 are received within the corresponding first receiving parts 403 of the first magnetic seat 40. Moreover, the junctions between the first plates 401 and the first sidewalls 402 of the first magnetic seat 40 are partially received within the corresponding first notches 421b, and the junctions between the second plates 411 and the second sidewalls 412 of the second magnetic seat 41 are partially received within the corresponding second notches 421c. The upper locking elements 422a of the inner plate 422 and the first engaging elements 401a are engaged with each other, so that the insulation seat 42 and the first magnetic seat 40 are combined together. Moreover, the top edge of the magnetic sleeve 45 is stopped by the upper locking elements 422a of the inner plate 422. Consequently, the first magnetic seat 40, the magnetic sleeve 45 and the insulation seat 42 are combined together. The fixing elements 420c of the insulation seat 42 are engaged with the fourth engaging elements 411b of the second magnetic seat 41, so that the second magnetic seat 41 and the insulation seat 42 are combined together. The lower locking elements 422b of the inner plate 422 and the second engaging elements 411a are engaged with each other, so that the insulation seat 42 and the second magnetic seat 41 are combined together. Moreover, the bottom edge of the magnetic sleeve 45 is stopped by the lower locking elements 422b of the inner plate 422. Consequently, the second magnetic seat 41, the magnetic sleeve 45 and the insulation seat 42 are combined together. Afterwards, the third engaging elements 441 of the circuit board 44 are aligned with the corresponding fixing elements 420c of the insulation seat 42. By applying an external force to the insulation seat 42 to allow the fixing elements 420c to be penetrated through the corresponding third engaging elements 441 (i.e., the circular holes), the fixing elements 420c are engaged with the bottom surface of the circuit board. Consequently, the circuit board 44 and the insulation seat 42 are combined together. Meanwhile, the Hall element 443 of the circuit board 44 is positioned. The front side of the stator assembly 4 is shown in FIG. 5B. The rear side of the stator assembly 4 is shown in FIG. 5C.

As mentioned above, the insulation seat 42 of this embodiment comprises plural positioning structures, including the stopping elements 421a, the upper locking elements 422a, the lower locking elements 422b and the fixing elements 420c. By these positioning structures, the coil 43, the first magnetic seat 40, the second magnetic seat 41, the magnetic sleeve 45 and the circuit board 44 are securely positioned along the axial direction and the radial direction. Due to these positioning structures, the assembling process is simplified, fast and foolproof. Consequently, the assembling process is time-saving and cost-effective. Moreover, since one side of the insulation seat 42 is opened, the filled space of the coil 43 is effectively increased. Consequently, the operation efficiency of the slim reel-type brushless motor could be enhanced.

Since the insulation seat of the first embodiment and the insulation seat of the second embodiment have the same structure, the applications of the insulation seat of the present invention are expansive.

From the above descriptions, the present invention provides a slim reel-type brushless motor and an insulation seat of the slim reel-type brushless motor. The insulation seat comprises plural positioning structures such as the stopping elements, the upper locking elements, the lower locking elements and the fixing elements. By these positioning structures, the coil, the first magnetic seat, the second magnetic seat, the magnetic sleeve and the circuit board are securely positioned along the axial direction and the radial direction. Due to these positioning structures, the assembling process is simplified, fast and foolproof. Consequently, the assembling process is time-saving and cost-effective. Moreover, the slim reel-type brushless motor meets the safety regulations, and the operation efficiency of the slim reel-type brushless motor could be enhanced.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An insulation seat of a slim reel-type brushless motor, the insulation seat comprising:
    a ring-shaped bottom plate having an opening;
    an inner plate arranged around the opening, wherein at least one upper locking element is protruded upwardly from the inner plate, at least one lower locking element is protruded downwardly from the inner plate, and the at least one upper locking element and the at least one lower locking element are staggered; and
    an outer plate arranged around an outer periphery of the ring-shaped bottom plate,
    wherein an accommodation space is defined by the ring-shaped bottom plate, the inner plate and the outer plate, and a coil is disposed within the accommodation space, wherein the at least one upper locking element of the inner plate is engaged with a first magnetic seat, and the at least one lower locking element of the inner plate is engaged with a second magnetic seat.

2. The insulation seat according to claim 1, wherein the first magnetic seat comprises at least one first engaging element corresponding to the at least one upper locking element of the inner plate, and the second magnetic seat comprises at least one second engaging element corresponding to the at least one lower locking element of the inner plate.

3. The insulation seat according to claim 2, wherein the upper locking element and the lower locking element of the inner plate are hooks, and the first engaging element of the first magnetic seat and the second engaging element of the second magnetic seat are engaging holes corresponding to the hooks, wherein the at least one upper locking element is engaged with the at least one first engaging element, and the at least one lower locking element is engaged with the at least one second engaging element.

4. The insulation seat according to claim 1, wherein the outer plate comprises at least one stopping element, and the at least one stopping element is disposed on an inner surface of the outer plate and located at a specified height, wherein when the coil is disposed within the accommodation space of the insulation seat, a top surface of the coil is stopped by the at least one stopping element, so that the coil is positioned in the accommodation space.

5. The insulation seat according to claim 1, wherein the ring-shaped bottom plate further comprises at least one fixing element, wherein the at least one fixing element is disposed on a bottom surface of the ring-shaped bottom plate, and the insulation seat and a circuit board are combined together through the at least one fixing element.

6. The insulation seat according to claim 5, wherein the circuit board comprises at least one third engaging element corresponding to the at least one fixing element of the ring-shaped bottom plate, and the fixing element is a cylindrical post including a protrusion part, a neck part and a head part, wherein a diameter of the neck part is smaller than a diameter of the protrusion part and a diameter of the head part, and the diameter of the head part is larger than the diameter of the neck part and the diameter of the protrusion part, wherein the third engaging element of the circuit board is a circular hole corresponding to the fixing element, and a diameter of the third engaging element is substantially equal to the diameter of the neck part of the fixing element, wherein when an external force is applied to the insulation seat to allow the head part of the fixing element to be penetrated through the corresponding third engaging element, the neck part of the fixing element is received in the third engaging element, so that the third engaging element and the fixing element are engaged with each other.

7. The insulation seat according to claim 1, wherein the outer plate of the insulation seat further comprises at least one first notch and at least one second notch, the at least one first notch is formed in a top edge of the outer plate, and the at least one second notch is formed in a bottom edge of the outer plate, wherein when the first magnetic seat, the second magnetic seat and the insulation seat are combined together, a portion of the first magnetic seat is received within the at least one first notch and a portion of the second magnetic seat is received within the at least one second notch.

8. The insulation seat according to claim 1, wherein the coil is a preformed coil.

9. The insulation seat according to claim 1, wherein the slim reel-type brushless motor further comprises a magnetic sleeve, a top edge of the magnetic sleeve is stopped by the at least one upper locking element of the inner plate, and a bottom edge of the magnetic sleeve is stopped by the at least one lower locking element of the inner plate.

10. An insulation seat of a slim reel-type brushless motor, the insulation seat comprising:
a ring-shaped bottom plate comprising an opening and at least one fixing element;
an inner plate arranged around the opening; and
an outer plate arranged around an outer periphery of the ring-shaped bottom plate,
wherein an accommodation space is defined by the ring-shaped bottom plate, the inner plate and the outer plate, and a coil is disposed within the accommodation space, wherein the at least one fixing element is disposed on a bottom surface of the ring-shaped bottom plate, and the insulation seat and a circuit board are combined together through the at least one fixing element.

11. The insulation seat according to claim 10, wherein the circuit board comprises at least one third engaging element corresponding to the at least one fixing element of the ring-shaped bottom plate, and the fixing element is a cylindrical post including a protrusion part, a neck part and a head part, wherein a diameter of the neck part is smaller than a diameter of the protrusion part and a diameter of the head part, and the diameter of the head part is larger than the diameter of the neck part and the diameter of the protrusion part, wherein the third engaging element of the circuit board is a circular hole corresponding to the fixing element, and a diameter of the third engaging element is substantially equal to the diameter of the neck part of the fixing element, wherein when an external force is applied to the insulation seat to allow the head part of the fixing element to be penetrated through the corresponding third engaging element, the neck part of the fixing element is received in the third engaging element, so that the third engaging element and the fixing element are engaged with each other.

12. The insulation seat according to claim 10, wherein at least one upper locking element is protruded upwardly from the inner plate, at least one lower locking element is protruded downwardly from the inner plate, and the at least one upper locking element and the at least one lower locking element are staggered, wherein the at least one upper locking element of the inner plate is engaged with a first magnetic seat, and the at least one lower locking element of the inner plate is engaged with a second magnetic seat.

13. The insulation seat according to claim 12, wherein the slim reel-type brushless motor further comprises a magnetic sleeve, a top edge of the magnetic sleeve is stopped by the at least one upper locking element of the inner plate, and a bottom edge of the magnetic sleeve is stopped by the at least one lower locking element of the inner plate.

14. The insulation seat according to claim 12, wherein the first magnetic seat comprises at least one first engaging element corresponding to the at least one upper locking element of the inner plate, and the second magnetic seat comprises at least one second engaging element corresponding to the at least one lower locking element of the inner plate.

15. The insulation seat according to claim 14, wherein the upper locking element and the lower locking element of the inner plate are hooks, and the first engaging element of the first magnetic seat and the second engaging element of the second magnetic seat are engaging holes corresponding to the hooks, wherein the at least one upper locking element is engaged with the at least one first engaging element, and the at least one lower locking element is engaged with the at least one second engaging element.

16. The insulation seat according to claim 10, wherein the outer plate comprises at least one stopping element, and the at least one stopping element is disposed on an inner surface of the outer plate and located at a specified height, wherein when the coil is disposed within the accommodation space of the insulation seat, a top surface of the coil is stopped by the at least one stopping element, so that the coil is positioned in the accommodation space.

17. The insulation seat according to claim 10, wherein the outer plate of the insulation seat further comprises at least one first notch and at least one second notch, the at least one first notch is formed in a top edge of the outer plate, and the at least one second notch is formed in a bottom edge of the outer plate, wherein when the first magnetic seat, the second magnetic seat and the insulation seat are combined together, a portion of the first magnetic seat is received within the at least one first notch and a portion of the second magnetic seat is received within the at least one second notch.

18. A slim reel-type brushless motor, comprising:
a first magnetic seat;
a second magnetic seat;
an insulation seat comprising a ring-shaped bottom plate, an inner plate and an outer plate, wherein the ring-shaped bottom plate has an opening, the inner plate is arranged around the opening, at least one upper locking element is protruded upwardly from the inner plate, at least one lower locking element is protruded downwardly from the inner plate, the at least one upper locking element and the at least one lower locking element are staggered, and the outer plate is arranged around an outer periphery of the ring-shaped bottom plate;
a coil; and
a circuit board,
wherein an accommodation space is defined by the ring-shaped bottom plate, the inner plate and the outer plate, and the coil is disposed within the accommodation space, wherein the at least one upper locking element of the inner plate is engaged with the first magnetic seat, the at least one lower locking element of the inner plate is engaged with the second magnetic seat, and the circuit board is positioned under the insulation seat.

19. The slim reel-type brushless motor according to claim 18, wherein the outer plate comprises at least one stopping element, and the at least one stopping element is disposed on an inner surface of the outer plate and located at a specified height, wherein when the coil is disposed within the accommodation space of the insulation seat, a top surface of the coil is stopped by the at least one stopping element, so that the coil is positioned in the accommodation space.

20. The slim reel-type brushless motor according to claim 18, wherein the ring-shaped bottom plate further comprises at least one fixing element, wherein the at least one fixing element is disposed on a bottom surface of the ring-shaped bottom plate, and the insulation seat and a circuit board are combined together through the at least one fixing element.

21. The slim reel-type brushless motor according to claim 20, wherein the circuit board comprises at least one engaging element corresponding to the at least one fixing element of the ring-shaped bottom plate, and the fixing element is a cylindrical post including a protrusion part, a neck part and a head part, wherein a diameter of the neck part is smaller than a diameter of the protrusion part and a diameter of the head part, and the diameter of the head part is larger than the diameter of the neck part and the diameter of the protrusion part, wherein the engaging element of the circuit board is a circular hole corresponding to the fixing element, and a diameter of the engaging element is substantially equal to the diameter of the neck part of the fixing element, wherein when an external force is applied to the insulation seat to allow the head part of the fixing element to be penetrated through the corresponding engaging element, the neck part of the fixing element is received in the engaging element, so that the engaging element and the fixing element are engaged with each other.

22. The slim reel-type brushless motor according to claim 18, wherein the outer plate of the insulation seat further comprises at least one first notch and at least one second notch, the at least one first notch is formed in a top edge of the outer plate, and the at least one second notch is formed in a bottom edge of the outer plate, wherein when the first magnetic seat, the second magnetic seat and the insulation seat are combined together, a portion of the first magnetic seat is received within the at least one first notch and a portion of the second magnetic seat is received within the at least one second notch.

23. The slim reel-type brushless motor according to claim 18, wherein the slim reel-type brushless motor further comprises a magnetic sleeve, a top edge of the magnetic sleeve is stopped by the at least one upper locking element of the inner plate, and a bottom edge of the magnetic sleeve is stopped by the at least one lower locking element of the inner plate.

24. A slim reel-type brushless motor, comprising:
a first magnetic seat;
a second magnetic seat;
a magnetic sleeve;
an insulation seat comprising a ring-shaped bottom plate, an inner plate and an outer plate, wherein the ring-shaped bottom plate has an opening, the inner plate is arranged around the opening, at least one upper locking element is protruded upwardly from the inner plate, at least one lower locking element is protruded downwardly from the inner plate, the at least one upper locking element and the at least one lower locking element are staggered, and the outer plate is arranged around an outer periphery of the ring-shaped bottom plate;
a coil; and
a circuit board,
wherein an accommodation space is defined by the ring-shaped bottom plate, the inner plate and the outer plate, and the coil is disposed within the accommodation space, wherein the at least one upper locking element of the inner plate is engaged with the first magnetic seat and a top edge of the magnetic sleeve, the at least one lower locking element of the inner plate is engaged with the second magnetic seat and a bottom edge of the magnetic sleeve, and the circuit board is positioned under the insulation seat.

25. The insulation seat according to claim 24, wherein the outer plate comprises at least one stopping element, and the at least one stopping element is disposed on an inner surface of the outer plate and located at a specified height, wherein when the coil is disposed within the accommodation space of the insulation seat, a top surface of the coil is stopped by the at least one stopping element, so that the coil is positioned in the accommodation space.

26. The insulation seat according to claim 24, wherein the ring-shaped bottom plate further comprises at least one fixing element, wherein the at least one fixing element is disposed on a bottom surface of the ring-shaped bottom plate, and the insulation seat and a circuit board are combined together through the at least one fixing element.

27. The insulation seat according to claim 24, wherein the circuit board comprises at least one engaging element corresponding to the at least one fixing element of the ring-shaped bottom plate, and the fixing element is a cylindrical post including a protrusion part, a neck part and a head part, wherein a diameter of the neck part is smaller than a diameter of the protrusion part and a diameter of the head part, and the diameter of the head part is larger than the diameter of the neck part and the diameter of the protrusion part, wherein the engaging element of the circuit board is a circular hole corresponding to the fixing element, and a diameter of the engaging element is substantially equal to the diameter of the neck part of the fixing element, wherein when an external force is applied to the insulation seat to allow the head part of the fixing element to be penetrated through the corresponding engaging element, the neck part of the fixing element is received in the engaging element, so that the engaging element and the fixing element are engaged with each other.

28. The insulation seat according to claim 24, wherein the outer plate of the insulation seat further comprises at least one first notch and at least one second notch, the at least one first notch is formed in a top edge of the outer plate, and the at least one second notch is formed in a bottom edge of the outer plate, wherein when the first magnetic seat, the second magnetic seat and the insulation seat are combined together, a portion of the first magnetic seat is received within the at least one first notch and a portion of the second magnetic seat is received within the at least one second notch.

* * * * *